(12) United States Patent
Kim et al.

(10) Patent No.: US 10,728,792 B2
(45) Date of Patent: Jul. 28, 2020

(54) DEVICE AND METHOD FOR RECEIVING STREAMING SERVICE DATA IN MOBILE COMMUNICATION SYSTEM SUPPORTING PLURALITY OF RADIO ACCESS INTERFACES

(71) Applicant: Samsung Electronics Co., Ltd., Suwon-si, Gyeonggi-do (KR)

(72) Inventors: Jin-Hyoung Kim, Seongnam-si (KR); Chul-Ho Lee, Suwon-si (KR); Jiangwei Xu, Suwon-si (KR); Krishna Manohar Singh, Hwaseong-si (KR); Jin-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/762,778

(22) PCT Filed: Sep. 26, 2016

(86) PCT No.: PCT/KR2016/010770
§ 371 (c)(1),
(2) Date: Mar. 23, 2018

(87) PCT Pub. No.: WO2017/052334
PCT Pub. Date: Mar. 30, 2017

(65) Prior Publication Data
US 2019/0082348 A1  Mar. 14, 2019

(51) Int. Cl.
*H04W 28/02* (2009.01)
*H04W 88/06* (2009.01)
(Continued)

(52) U.S. Cl.
CPC ..... *H04W 28/0236* (2013.01); *H04L 65/4069* (2013.01); *H04W 4/24* (2013.01);
(Continued)

(58) Field of Classification Search
None
See application file for complete search history.

(56) References Cited

U.S. PATENT DOCUMENTS 7,702,329 B1 * 4/2010 Durig ............... H04W 8/183
455/432.1
10,171,423 B1 * 1/2019 Woodberg ......... H04L 63/0254
(Continued)

FOREIGN PATENT DOCUMENTS

KR    10-1297411 B1    8/2013
KR    10-1429891 B1    8/2014
(Continued)

*Primary Examiner* — Andrew C Oh
(74) *Attorney, Agent, or Firm* — Jefferson IP Law, LLP

(57) ABSTRACT

Disclosed is a method for receiving streaming service data in a mobile communication system supporting a plurality of radio access interfaces, comprising the steps of: operating in a first mode for receiving, from a server, streaming service data through a first interface among the plurality of radio access interfaces; and determining a transition to a second mode for receiving the streaming service data by using at least two radio access interfaces according to a radio network currently being used in the first mode.

13 Claims, 11 Drawing Sheets

(51) Int. Cl.
  *H04W 4/24* (2018.01)
  *H04L 29/06* (2006.01)
  *H04W 28/10* (2009.01)
  *H04W 76/15* (2018.01)
  *H04W 36/00* (2009.01)
  *H04W 72/08* (2009.01)
  *H04W 28/24* (2009.01)
  *H04W 36/14* (2009.01)

(52) U.S. Cl.
  CPC ... *H04W 28/0247* (2013.01); *H04W 28/0273* (2013.01); *H04W 28/10* (2013.01); *H04W 36/0022* (2013.01); *H04W 72/085* (2013.01); *H04W 76/15* (2018.02); *H04W 88/06* (2013.01); *H04W 28/24* (2013.01); *H04W 36/14* (2013.01)

(56) References Cited

U.S. PATENT DOCUMENTS

| | | | |
|---|---|---|---|
| 2007/0117564 A1 | 5/2007 | Reynolds | |
| 2007/0191012 A1 | 8/2007 | Park et al. | |
| 2009/0154426 A1 | 6/2009 | Perraud et al. | |
| 2011/0096683 A1* | 4/2011 | Suzuki | H04L 12/413 370/252 |
| 2012/0039176 A1* | 2/2012 | Eshan | H04L 1/0002 370/237 |
| 2012/0134328 A1* | 5/2012 | Gauvreau | H04L 5/0037 370/329 |
| 2012/0282942 A1* | 11/2012 | Uusitalo | H04W 16/14 455/452.2 |
| 2012/0307869 A1* | 12/2012 | Charbit | H04B 1/715 375/132 |
| 2013/0242897 A1* | 9/2013 | Meylan | H04L 43/16 370/329 |
| 2014/0286316 A1 | 9/2014 | Park et al. | |
| 2014/0369198 A1* | 12/2014 | Rinne | H04L 45/245 370/235 |
| 2014/0369329 A1* | 12/2014 | Lee | H04W 28/06 370/338 |
| 2015/0189468 A1 | 7/2015 | Yuk et al. | |
| 2015/0215839 A1* | 7/2015 | Johansson | H04W 36/22 455/426.1 |
| 2016/0050605 A1* | 2/2016 | Kim | H04W 76/28 370/331 |
| 2016/0073297 A1* | 3/2016 | Hwang | H04W 76/20 370/331 |
| 2016/0242186 A1* | 8/2016 | Nissila | H04W 28/0252 |
| 2016/0323779 A1* | 11/2016 | Laselva | H04W 28/08 |
| 2017/0170888 A1* | 6/2017 | Yrjola | H04W 16/28 |
| 2017/0264657 A1* | 9/2017 | Lee | H04W 28/08 |
| 2017/0318501 A1* | 11/2017 | Vikberg | H04W 72/085 |
| 2018/0020385 A1* | 1/2018 | Laselva | H04W 36/22 |
| 2019/0166643 A1* | 5/2019 | Petria | H04L 45/24 |

FOREIGN PATENT DOCUMENTS

| | | |
|---|---|---|
| KR | 10-2016-0038586 A | 4/2016 |
| WO | 2014/092417 A1 | 6/2014 |

\* cited by examiner

DEVICE AND METHOD FOR RECEIVING STREAMING SERVICE DATA IN MOBILE COMMUNICATION SYSTEM SUPPORTING PLURALITY OF RADIO ACCESS INTERFACES

CROSS-REFERENCE TO RELATED APPLICATION(S)

This application is a U.S. National Stage application under 35 U.S.C. § 371 of an International application number PCT/KR2016/010770, filed on Sep. 26, 2016, which is based on and claimed priority of a Korean patent application number 10-2015-0136988, filed on Sep. 25, 2015, in the Korean Intellectual Property Office, the disclosure of which is incorporated by reference herein in its entirety.

TECHNICAL FIELD

The present disclosure relates generally to a device and method for receiving streaming service data in a mobile communication system supporting a plurality of radio access interfaces.

BACKGROUND ART

When using services in a terminal supporting a plurality of radio access interfaces, advantages and disadvantages of using the services vary depending on a wireless network connected using the corresponding radio access interface. For example, it is assumed that a terminal supports a wireless fidelity (Wi-Fi) interface and a cellular interface.

A Wi-Fi wireless network is free of charge, has a lower installation cost than that of a cellular wireless network, and generally provides high-speed performance. However, a Wi-Fi wireless network has limited accessible areas, and has a performance that rapidly deteriorates with an increase in the number of users. In contrast, a cellular wireless network charges for data usage and has a lower maximum available data rate than that of a Wi-Fi wireless network, but generally provides stable performance and has a wide coverage area. Especially, in a mobile environment, an Internet connection through a cellular wireless network is generally stable. As described above, the Wi-Fi interface and the cellular interface may be mutually complementary, although they clearly have their own advantages and disadvantages c.

In accordance with the development of mobile communication, a terminal has developed to support at least two radio access interfaces, but when an actual service is used, an Internet connection is established through only one interface. Generally, the use of the Wi-Fi interface as a primary interface is prioritized. Thereby, when a corresponding terminal moves to a location where access to a Wi-Fi network is possible, an Internet connection is performed through the Wi-Fi interface even though the actual speed of offered services is relatively high. In this case, the Wi-Fi wireless network may become relatively easily unstable in the wireless network situation. In addition, since the actual available service provision coverage itself is small, it may frequently cause a decrease in user-perceived quality with respect to higher services such as streaming services or the like.

In addition, the selection and conversion (connection manager) function itself of the radio access interface in a current terminal determines a radio access interface to be used according to a channel status indicator received through the corresponding wireless networks, for example, a Received Signal Strength Indication (RSSI), and therefore there is still a problem in terms of the user-perceived quality because the characteristics of the higher services such as streaming services or the like cannot be considered.

Thus, new Hypertext Transfer Protocol (HTTP)-based streaming schemes have been proposed in order to provide seamless video playback by determining video quality flexibly in response to changes in the wireless network. The New HTTP-based streaming schemes include an Adobe Systems scheme, an HTTP Dynamic Streaming scheme, an Apple HTTP Live Streaming scheme, an Microsoft Smooth Streaming scheme, an adaptive streaming scheme such as a Moving Picture Experts Group (MPEG)-Dynamic Adaptive Streaming over HTTP standard, an adaptive bit rate streaming scheme, and the like. While the new HTTP-based streaming scheme enables seamless video playback, it is fundamentally impossible to reproduce image quality beyond available bandwidth and it may cause a problem of deterioration of user-perceived performance due to frequent changes in the image quality. That is, it is difficult to fundamentally solve the performance degradation and fluctuation problem of the wireless network only by the adaptive streaming scheme.

DETAILED DESCRIPTION OF THE INVENTION

Technical Problem

Therefore, there is a need for a method that can overcome the limitations of adaptive streaming services based on a single radio access interface.

According to aspects of the present disclosure, provided are a method and device for receiving a streaming service content using at least two radio access interfaces in parallel.

Technical Solution

In accordance with an aspect of the present disclosure, a method of receiving streaming service data in a mobile communication system supporting a plurality of radio access interfaces includes; operating in a first mode for receiving the streaming service data through a first interface among the plurality of radio access interfaces from a server; and determining a transition to a second mode for receiving the streaming service data using at least two radio access interfaces according to a wireless network that is currently used in the first mode.

In accordance with another aspect of the present disclosure, a device of receiving streaming service data in a mobile communication system supporting a plurality of radio access interfaces includes: a transmission and reception unit configured to transmit and receive a signal to and from a server; and a control unit configured to control an operation in a first mode for receiving the streaming service data through a first interface among the plurality of radio access interfaces from the server, and to determine a transition to a second mode for receiving the streaming service data using at least two radio access interfaces according to a wireless network that is currently used in the first mode.

Other aspects, advantages and essential features of the present disclosure will be apparent to those skilled in the art from the following detailed description, which is to be taken in conjunction with the accompanying drawings and which discloses preferred embodiments of the present disclosure.

Before undertaking the Detailed Description of the Disclosure, it may be advantageous to set forth definitions of certain words and phrases used throughout this patent document: the terms "include" and "comprise" and derivatives thereof, mean inclusion without limitation; the term "or" is inclusive and means "and/or"; the phrases "associated with" and "associated therewith" as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller", "processor", or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill in the art should understand that in many, if not most instances, such definitions apply to prior, as well as future uses of such defined words and phrases.

Advantageous Effects

The present disclosure can improve user-perceived performance by overcoming limitations caused by using a single-network-based streaming service, minimizing data charges, and utilizing high-quality seamless streaming services.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
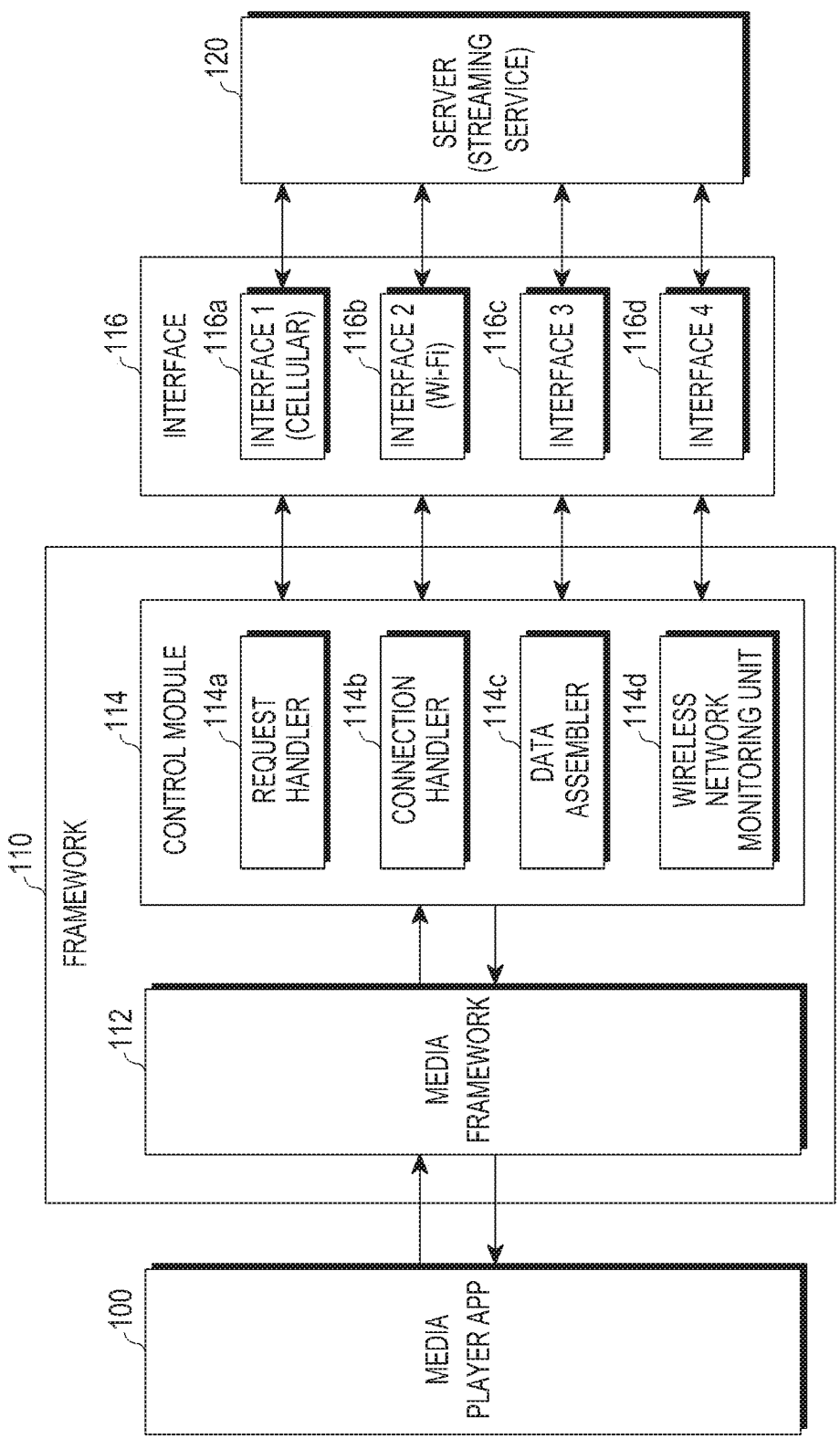
FIG. 1 is an example of a configuration diagram of a framework of a terminal according to an embodiment of the present disclosure.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

According to various embodiments of the present disclosure, an electronic device may include a communication functionality. The terminal may, for example, be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, or a wearable device (e.g., Head-Mounted Device (HMD), electronic clothes, an electronic bracelet, an electronic necklace, an electronic appcessory, an electronic tattoo, or a smart watch).

According to various embodiments of the present disclosure, the electronic device may be a smart home appliance with a communication functionality. The smart home appliance may, for example, be a television, a Digital Video Disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present disclosure, the terminal may be a medical appliance (e.g., Magnetic Resonance Angiography (MRA) device, Magnetic Resonance Imaging (MRI) device, Computed Tomography (CT) device, and ultrasonic device), a navigation device, a Global Positioning System (GPS) receiver, an Event Data Recorder (EDR), a Flight Data Recorder (FDR), an automotive infotainment device, a marine electronic device (e.g., ship navigation device and a gyrocompass), avionics, security equipment, or an industrial or home robot.

According to various embodiments of the present disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present disclosure, the electronic device may be a combination of the above-mentioned devices. Further, it will be apparent to those skilled in the art that the terminal according to various embodiments of the present disclosure is not limited to the above-mentioned devices.

According to various embodiments of the present disclosure, a terminal may be, for example, an electronic device.

In addition, according to various embodiments of the present disclosure, for example, a terminal operates as a receiving device that receives streaming service data, and a server operates as a transmitting device that transmits streaming service data.

Hereinafter, an embodiment of the present disclosure proposes a method and device for receiving a streaming service content using at least two radio access interfaces in parallel in a mobile communication system supporting a plurality of radio access interfaces. In this specification, for convenience of description, the use of a radio access interface by a terminal and the connection of a terminal to a wireless network will be mixed and described in the same meaning.

On the other hand, the method and device proposed in the embodiment of the present disclosure can be applied to various communication systems including mobile broadcasting services including an Institute of Electrical and Electronics Engineers (IEEE) (hereinafter, referred to as 'IEEE') 802.16m communication system, a Digital Multimedia Broadcasting (DMB), (hereinafter, referred to as 'DMB') service, portable Digital Video Broadcasting Handheld (DVP-H) (hereinafter, referred to as 'DVP-H'), an Advanced Television Systems Committee Mobile/Handheld (ATSC-M/H) (hereinafter, referred to as 'ATSC-M/H') service, a digital video broadcasting system, an Internet Protocol TeleVision (IPTV) (hereinafter, referred to as 'IPTV') service, and the like; and various communication systems including a Moving Picture Experts Group (MPEG) media transport (MMT) (hereinafter, referred to as 'MMT') system, an Evolved Packet System (EPS) (hereinafter, referred to as 'EPS'), a Long-Terms Evolution (LTE) (hereinafter, referred to as 'LTE') mobile communication system, a Long-Term Evolution-advanced (LTE-A) (hereinafter, referred to as 'LTE-A') mobile communication system, a High Speed Downlink Packet Access (HDSPA) (hereinafter, referred to as 'HSDPA') mobile communication system, a high speed uplink packet access (HSUPA) (hereinafter, referred to as 'HSUPA') mobile communication system, a $3^{rd}$ Generation Project Partnership 2 (3GPP2) (hereinafter, referred to as '3GPP2') High Rate Packet Data (HRPD) (hereinafter, referred to as 'HRPD') mobile communication system, a 3GPP2 Wideband Code Division Multiple Access (WCDMA) (hereinafter, referred to as 'WCDMA') mobile communication system, a 3GPP2 Code Division Multiple Access (CDMA) (hereinafter, referred to as 'CDMA') mobile communication system, a Mobile Internet Protocol (Mobile IP) (hereinafter, referred to as 'Mobile IP') system, and the like.

First, terminologies used in various embodiments of the present disclosure will be described below.

(1) Segment

A segment denotes a part of a streaming service content, e.g., a video content, and the streaming service content includes at least one segment.

When a streaming service is downloaded using a Hypertext Transfer Protocol (HTTP) Progressive Download (PL) protocol and an HTTP Adaptive Streaming (AS) protocol which are video streaming protocols based on an HTTP, a size of the segment may be determined as the following.

First, in a case that the streaming service is downloaded using an HTTP PL protocol, an entity fragmenting/merging streaming service data, for example, a data assembler 114c of FIG. 1 autonomously determines a segment size of a fixed/variable size in order for a terminal to use a plurality of radio access interfaces. For example, when the streaming service is downloaded using the HTTP PL protocol, a segment size may be determined as 10 MB. Alternatively, the segment size may be determined as a bit rate of a streaming service*segment time thereof.

Secondly, when the streaming service is downloaded using an HTTP AS protocol, a basic unit to which encoding is applied based on a plurality of bit rates is the segment. In this case, a segment size is determined in an application layer.

(2) (Chunk)

When a plurality of radio access interfaces is used at the same time, a chunk denotes a range or amount of streaming service data which is intended to receive through each of the plurality of radio access interfaces. The chunk is a part of the segment, and one segment includes at least one chunk.

When one segment includes a plurality of chunks, and the plurality of radio access interfaces is used at the same time, each of the plurality of chunks will be received through each of the plurality of radio access interfaces, or the plurality of chunks will be received through one of the plurality of radio access interfaces, or the plurality of chunks will be received through a part of the plurality of radio access interfaces.

Exceptionally, when a size of a segment is less than a threshold segment size, a plurality of segments may be configured as one chunk. Here, the threshold segment size may be determined appropriate to a situation of a mobile communication system, and detailed description of an operation itself of determining the threshold segment size will be omitted herein.

Hereinafter, a case in which a plurality of radio access interfaces supported by a mobile communication system in an embodiment of the present disclosure support, for example, a wireless fidelity (Wi-Fi) interface and a cellular interface. The cellular interface includes, for example, a long term evolution-advanced (LTE) interface, an LTE-A (advanced) interface, and the like. Accordingly, a case in which a terminal according to the embodiment of the present disclosure supports, for example, a Wi-Fi interface and a cellular interface will be assumed and described.

In order to allow a terminal to be connected in parallel with two or more radio access interfaces according to an embodiment of the present disclosure, a framework may be included in the terminal. FIG. 1 is an example of a configuration diagram of a framework of a terminal according to an embodiment of the present disclosure.

Referring to FIG. 1, a framework 110 according to an embodiment of the present disclosure a media framework includes a media framework 112 for transmitting and receiving signals to and from a media player application (hereinafter referred to as 'APP') 100 installed in a terminal and a control module 114 for transmitting and receiving signals to and from each of radio access interfaces supported by the media framework 112 and the terminal in a set 116 of the radio access interfaces.

In FIG. 1, it is assumed that the number of the radio access interface sets 116 that is used for the terminal to be connected to a server 120 providing a streaming service is 4. For example, the radio access interface set 116 includes an interface 1 (116a) for supporting a connection to the server 120 through a wireless connection to a cellular network, an interface 2 (116b) for supporting a connection to the server 120 through a wireless connection to a Wi-Fi network, and an interface 3 (116c) and an interface 4 (116d) for supporting a connection to the server 120 through other wireless networks.

The control module 114 according to an embodiment of the present disclosure includes a request handler 114a, a connection handler 114b, a data assembler 114c, and a wireless network monitoring unit 114d.

First, when an HTTP request for receiving a streaming service content is generated, the request handler 114a divides the HTTP request into a plurality of HTTP range requests corresponding to the number of interfaces 116a to 116d supported by the terminal and transmits the divided requests to each of the interfaces 116a to 116d. For convenience of description, it is assumed that a streaming service is a video and the HTTP request is generated in order to receive each video segment. The HTTP range request then refers to a reception request for a portion of the corresponding video segment. That is, the video segment may be divided into a plurality of chunks, and a reception request for each chunk corresponds to the HTTP range request. Here, a chunk division method of determining the size of each segment may comply with the above-described method according to the embodiment or may be proportional to the reception speed of each interface. Alternatively, the size of each segment may be equally divided or arbitrarily allocated.

The connection handler 114b performs a TCP connection (session) for the reception of a video segment on the server 120 through each of the interfaces 116a to 116d included in the interface set 116. Meanwhile, in the case of the server 120, when data transmission/reception does not occur for a certain period of time during TPC connections connected to the server 120, the corresponding connection can be disconnected. In order to prevent such a situation, when it is in a backup mode state in a multi-network-based streaming mode, the connection handler 114b according to the embodiment of the present disclosure may establish a TCP connection to the server 120 via the cellular interface and monitor the corresponding connection state. When data transmission/reception does not occur through the corresponding TCP connection based on the monitored result, the server 120 may request the server 120 to intermittently receive a small amount of streaming data in order to prevent occurrence of a case in which the server 120 disconnects the connection. Alternatively, when the server 120 disconnects the corresponding connection, the connection handler 114b according to an embodiment may establish the TCP connection again. When it is difficult to use the Wi-Fi interface through the operation of the connection handler 114b, the connection to the cellular network can be guaranteed immediately through the cellular interface in order to provide a seamless streaming service.

When portions of different video segments, that is, chunks, which correspond to each of the HTTP range requests described above are received, the data assembler 114b according to an embodiment of the present disclosure recombines the received chunks in order and transmits the recombined chunks to the media framework 112.

The wireless network monitoring unit 114d according to the embodiment of the present disclosure monitors the performance of each wireless network or interface. That is, the wireless network monitoring unit 114d measures and monitors the reception speed of each of the interfaces 116a to 116d. Also, the wireless network monitoring unit 114d may monitor the reception signal state of each of the interfaces 116a to 116d to detect the state of the corresponding wireless network in real-time.

Hereinafter, in the embodiment of the present disclosure, proposed is a method in which a target bit rate is set for a streaming service to be received by a terminal and a stable streaming service can be used by using a Wi-Fi interface and a cellular interface in parallel.

Specifically, in the embodiment of the present disclosure, a streaming mode that allows a terminal to use a plurality of radio access interfaces in parallel upon reception of a streaming service content is defined as a "multi-network-based streaming mode". A method for limiting the flow rate of data so that the streaming service content corresponding to a target bit rate can be provided when an existing terminal uses a single radio access interface is proposed.

First, the "single-network-based streaming mode" is a general streaming mode in which a terminal supporting a plurality of wireless access interfaces receives the corresponding streaming service content through a connection to a single wireless network.

Next, the "multi-network-based streaming modes" according to the embodiment of the present disclosure is operated such that a preset target bit rate for the streaming service is maintained to minimize changes in the quality of the streaming service (for example, corresponds to image quality in the case of a video service) and to seamlessly provide the streaming service of the target bit rate. In the "multi-network-based streaming mode" according to the embodiment of the present disclosure, in order to minimize data charges, the connection to the cellular network is limited to be performed only when necessary. As to the target bit rate according to the embodiment of the present disclosure, a user may arbitrarily select one of the bit rates provided for the corresponding streaming service content, or the target bit rate may be set as a default in the corresponding system. For example, the target bit rate of the streaming service corresponding to the video service is generally a high definition image quality or a quality close to the high definition image quality.

Figure 2:
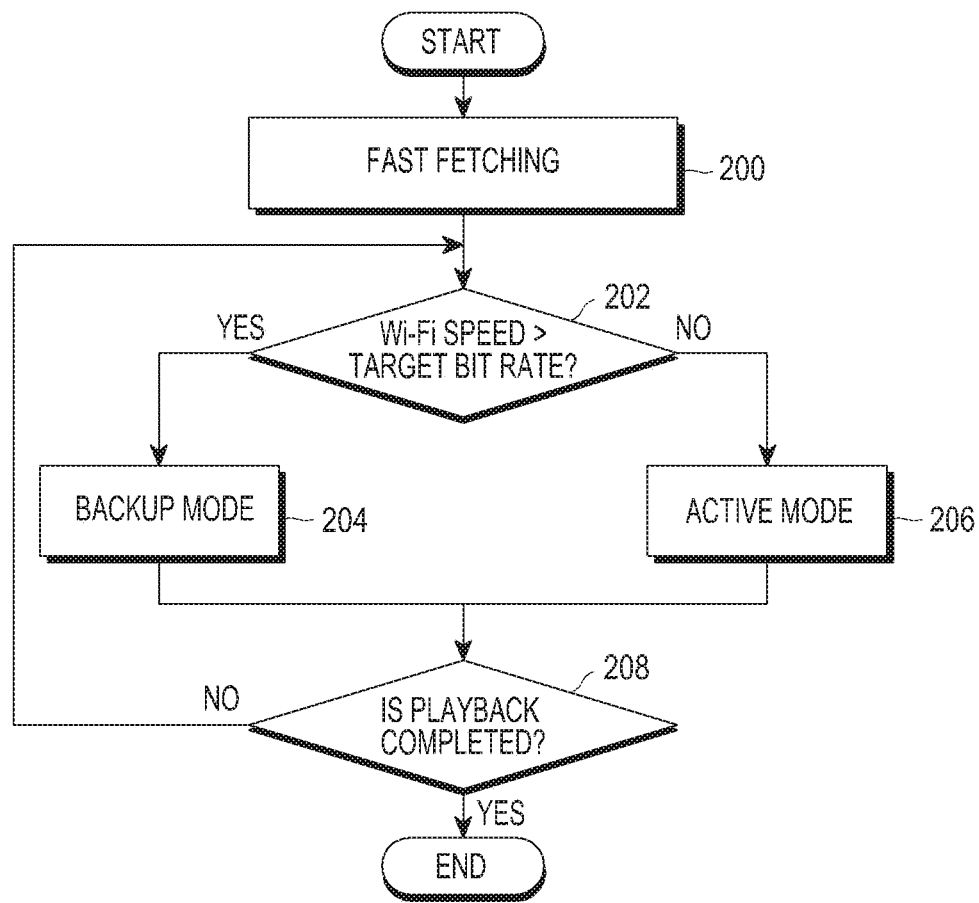
FIG. 2 is an example of a flowchart of the operation of a terminal in a multi-network-based streaming mode according to an embodiment of the present disclosure.

Specifically, the multi-network-based streaming mode according to the embodiment of the present disclosure may include a fast fetching mode, an active mode, and a backup mode. FIG. 2 is an example of a flowchart of the operation of a terminal in a multi-network-based streaming mode according to an embodiment of the present disclosure.

Referring to FIG. 2, when a multi-network-based streaming mode is executed, a terminal performs fast fetching in order to reduce a pre-buffering time and measure a connection state of each wireless network in operation 200. Here, the connection state of each wireless network includes throughput and delay of the corresponding network. Upon the fast fetching, the terminal may simultaneously access a Wi-Fi network and a cellular network using both a Wi-Fi interface and a cellular interface to receive an initial segment of the corresponding streaming service. The terminal may acquire the speed of the Wi-Fi network through the fast fetching. For example, the terminal may estimate the speed of the Wi-Fi network based on an amount of streaming service data received per unit time during fast fetching. Alternatively, the terminal may estimate the speed of the Wi-Fi network based on an amount of streaming service data received every predetermined time from when the terminal receives a streaming service chunk through the Wi-Fi interface.

Next, in operation 202, the terminal compares a target bit rate with a Wi-Fi speed. In operation 204, when the Wi-Fi speed exceeds the target bit rate as a result of the comparison, the terminal operates in the backup mode. In the backup mode according to the embodiment of the present disclosure, when the connection to the Wi-Fi network is difficult while an active state of the cellular interface is maintained, the terminal is intermittently connected to the server providing the streaming service through a cellular network using an cellular interface to receive a small amount of data or to maintain only a Transmission Control Protocol (TCP) connection for data reception.

In operation 206, when the Wi-Fi speed is less than or equal to the target bit rate based on a result of the comparison, the terminal operates in an active mode. In the active mode according to the embodiment of the present disclosure, the Wi-Fi interface and the cellular interface are simultaneously used, the streaming service content is maximally received through the Wi-Fi network in order to ensure the target bit rate of the streaming service to be received by a terminal, and the remaining portions of the streaming service content which fail to be received through the Wi-Fi network are received through the cellular network. In the active mode, it is possible to support the simultaneous use of two or more radio access interfaces using a chunk division method for the streaming service data. The chunk division method according to the embodiment of the present disclosure will be described later in detail with reference to FIGS. 3A and 3B.

Next, in operation 208, whether the playback of the streaming service that the terminal desired to receive is completed is determined. When the playback of the streaming service is not completed based on a result of the determination, the corresponding procedure returns to operation 202 to receive the remaining streaming service data. When the playback of the streaming service is completed based on the result of the determination, the corresponding operation is completed.

The multi-network-based streaming mode according to the embodiment of the present disclosure may be subdivided into three schemes according to a chunk division method considering power consumption. Here, the three methods include a standard scheme, a data-saving scheme, and a battery-saving scheme, and each scheme will be described as follows.

First, the standard method according to the embodiment of the present disclosure is a scheme for ensuring a minimum quality at the target bit rate or more preset for the streaming service content, and receives streaming service data to be maximally received through a connection to the Wi-Fi network and receives the remaining data through the cellular network.

Next, the data-saving scheme according to the embodiment of the present disclosure is a scheme for maintaining the quality corresponding to the target bit rate preset for the streaming service. At this time, when the connection to the Wi-Fi network is possible, the terminal generally operates in the same manner as a method using the Wi-Fi interface (hereinafter referred to as a 'normal mode'). When the terminal can use only the cellular interface, the use of cellular data may be limited so that the streaming service is provided at the target bit rate.

Lastly, the battery-saving scheme according to the embodiment of the present disclosure is a scheme for reducing the power consumption by reducing the activation time of each of the Wi-Fi interface and the cellular interface while maintaining the quality corresponding to the target bit rate preset for the streaming service. At this time, when the connection to the Wi-Fi network is possible, a chunk division method different from the normal mode and the data-saving method is used. The chunk division method will be described later in detail. When only the cellular interface can be used, as in the case of using the cellular interface in the data-saving scheme, the use of the cellular data may be limited so that the streaming service is provided at the target bit rate.

The chunk division according to the embodiment of the present disclosure may be performed based on a power model considering promotion power, active power (for each throughput), tail power, and the like for each of the radio access interfaces. Accordingly, the chunk division is divided into a method of performing a chunk division in proportion to a throughput (hereinafter referred to as a 'throughput-proportional chunk division') and a method of maximally using the Wi-Fi network (hereinafter referred to as 'Wi-Fi maximum use-chunk division').

Figure 3A:
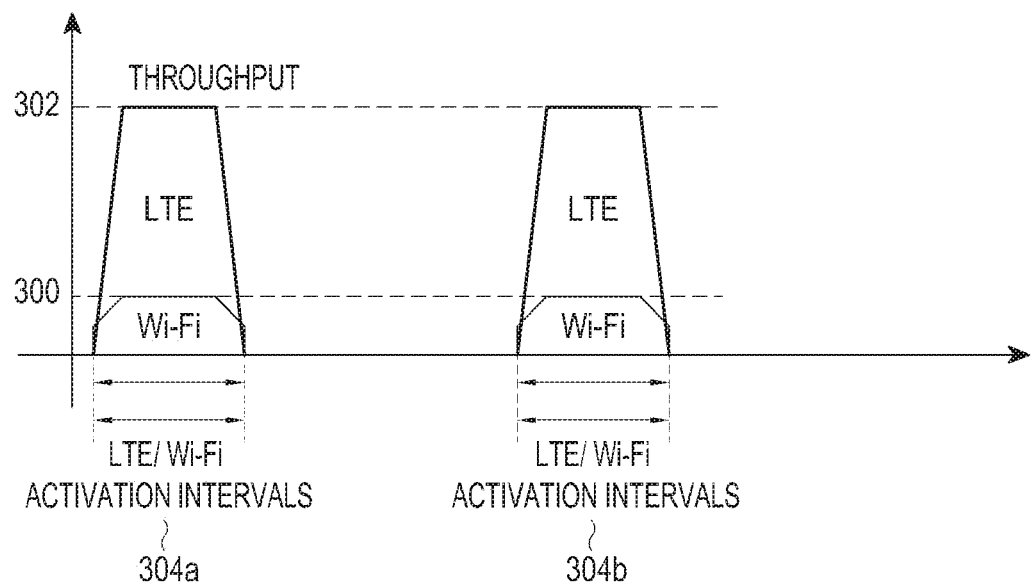
FIG. 3A is an example of a diagram for explaining throughput-proportional chunk division according to an embodiment of the present disclosure.

FIG. 3A is an example of a diagram for explaining throughput-proportional chunk division according to an embodiment of the present disclosure. For convenience of description, a terminal supports a Wi-Fi interface and a cellular interface, and for example, it is assumed that the cellular interface is an LTE interface.

Referring to FIG. 3A, in the throughput-proportional chunk division according to the embodiment of the present disclosure, chunks can be divided in proportion to the throughput of each wireless network for the reception of the streaming service content in Wi-Fi/LTE activation intervals 304a and 304b set in the same time interval. When the corresponding streaming service content is received, a throughput 302 of an LTE network is significantly larger than a throughput 300 of the Wi-Fi network in the same time interval. Therefore, the proportional chunk size can be calculated such as in Equation 1 below.

$$\text{chunk size}_{Wi-Fi} = \text{segment size} \times \frac{\text{speed}_{Wi-Fi}}{\text{speed}_{Wi-Fi} + \text{speed}_{Wi-Fi}} \quad \text{Equation 1}$$

$$\text{chunk size}_{LTE} = \text{segment size} \times \frac{\text{speed}_{LTE}}{\text{speed}_{Wi-Fi} + \text{speed}_{Wi-Fi}}$$

Here, a chunk size$_{Wi-Fi}$ and a chunk size$_{LTE}$ respectively denote a chunk size for the Wi-Fi network and a chunk size for the LTE network, and a speed$_{Wi-Fi}$ and a speed$_{LTE}$ respectively denote a speed for the Wi-Fi network and a speed for the LTE network. Here, the speed of each wireless network may be estimated by a terminal based on an amount of streaming service data received per unit time or based on an amount of streaming service data received every predetermined time from the time when the terminal starts to receive chunks through the radio access interface.

Figure 3B:
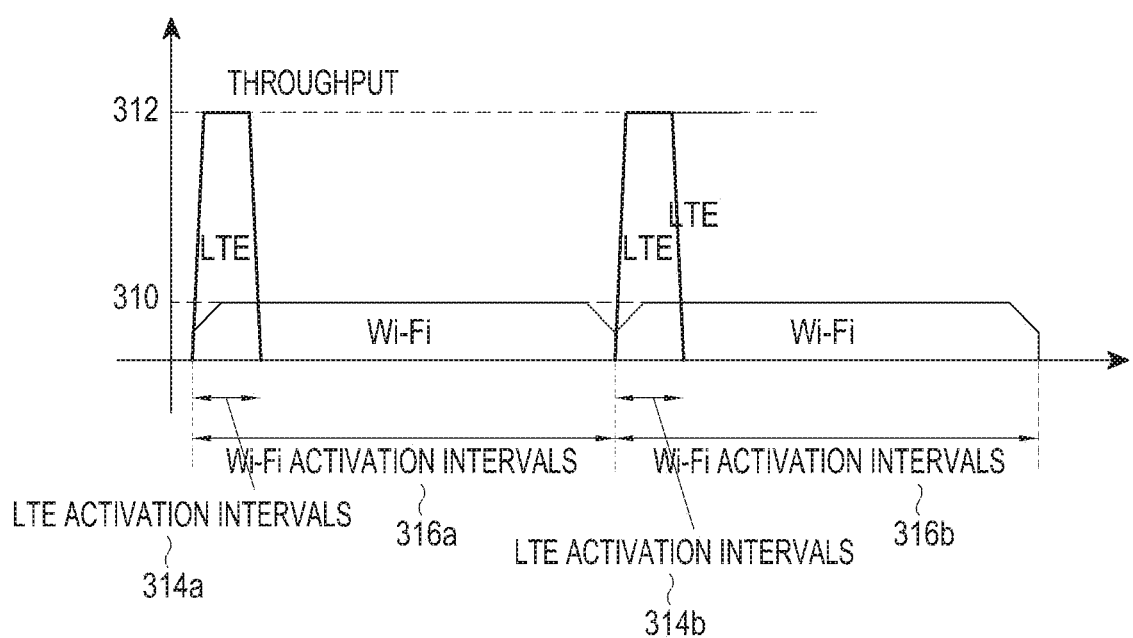
FIG. 3B is an example of a diagram for explaining Wi-Fi maximum use-chunk division according to an embodiment of the present disclosure.

FIG. 3B is an example of a diagram for explaining Wi-Fi maximum use-chunk division according to an embodiment of the present disclosure.

Referring to FIG. 3B, in the Wi-Fi maximum use-chunk division according to an embodiment of the present disclosure, a time interval corresponding to a maximum value of a throughput that can be received through a Wi-Fi network is set in Wi-Fi activation intervals 316a and 316b, and a time interval corresponding to a throughput of the remaining data except for the maximum value of the throughput acquired through the Wi-Fi network among the streaming service data to be received is set in LTE activation intervals 314a and 314b so that the corresponding time interval is processed through an LTE network. As shown in FIG. 3B, the LTE activation intervals 314a and 314b is set to be relatively shorter than the Wi-Fi activation intervals 316a and 316b because of the LTE speed relatively faster than the Wi-Fi network. Accordingly, when using Wi-Fi maximum use-chunk division, data charges can be minimized. When performing Wi-Fi maximum use-chunk division according to the embodiment of the present disclosure, the chunk size for each wireless network can be calculated as shown in Equation 2 below.

$$\text{chunk size}_{Wi-Fi} = \text{segment size} \times \frac{\text{speed}_{Wi-Fi}[\text{bps}]}{\text{target bit rate } [\text{bps}]} \quad \text{Equation 2}$$

$$\text{chunk size}_{LTE} = \text{segment size} \times \left(1 - \frac{\text{speed}_{Wi-Fi}[\text{bps}]}{\text{target bit rate } [\text{bps}]}\right)$$

Here, in Equation 2, in the Wi-Fi maximum use-chunk division, the chunk size of an LTE network may be calculated using a value obtained by subtracting a value obtained by dividing a Wi-Fi speed into a target bit rate in FIG. 1 for the purpose of maximum utilization of a Wi-Fi network.

Table 1 shows a chunk division method which is used in a fast fetching mode and an active mode for each of three schemes of a multi-network-based streaming mode.

TABLE 1

|  | Standard scheme | Data-saving scheme | Battery-saving scheme |
| --- | --- | --- | --- |
| Fast fetching | Throughput-proportional chunk division | Throughput-proportional chunk division | Throughput-proportional chunk division |
| Active mode | Wi-Fi maximum use-chunk division | Wi-Fi maximum use-chunk division | Throughput-proportional chunk division |

Referring to Table 1, only in the active mode of the standard scheme and the data-saving scheme of the multi-network-based streaming mode, the streaming service data may be maximally received through the Wi-Fi network using Wi-Fi maximum use-chunk division.

In comparison, in the case of a general single-network-based streaming mode, a terminal supports a Wi-Fi interface and a cellular interface and, for example, it is assumed that a cellular interface is an LTE interface. In this case, since the speed of the LTE network is higher than that of the Wi-Fi network, when an adaptive streaming scheme is used, a content at a target bit rate or more among contents corresponding a streaming service to be received may be selected. In this case, regardless of a user's intention, the content at the target bit rate or more is selected, so that undesired charging and battery consumption of the user may occur. Therefore, in the embodiment of the present disclosure, speed limitation is performed to maintain the quality corresponding to the target bit rate for data charges and battery saving in a general single-network-based streaming mode.

Figure 4A:
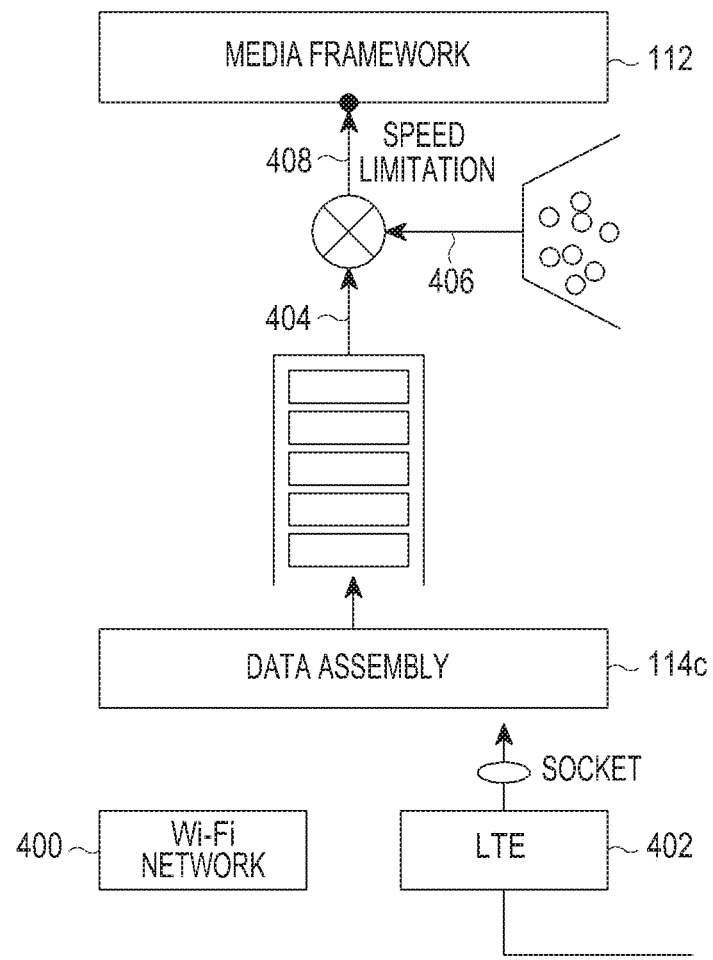
FIG. 4A is an example of a speed limitation method in a single-network-based streamlining mode according to an embodiment of the present disclosure.

FIG. 4A is an example of a speed limitation method in a single-network-based streamlining mode according to an embodiment of the present disclosure. For convenience of explanation, it is assumed that the framework of a terminal is configured as shown in FIG. 1.

Referring to FIG. 4A, for example, it is assumed that a terminal operates in a single-network-based streaming mode and receives streaming service data only through an LTE network 420 through a socket corresponding to an LTE interface. In this case, although not shown in the drawing, a media framework 112 according to the embodiment of the present disclosure continuously generates an HTTP request for a segment having the quality of a target bit rate. Then, a request handler, which is not shown, transmits the HTTP request to a socket, thereby limiting the read speed of the socket for the streaming service data introduced from the LTE network 402.

Next, in operation 404, a data assembler 114c recombines and buffers streaming service data, a segment, or a chunk, which are introduced at a speed corresponding to the target data rate through the socket, in order. Then, in operation 406, a multiplexer performs speed limitation for transmitting the streaming service data, segment, or chunk, which is buffered through operation 404 operation, to the media framework at a speed corresponding to the target rate. Specifically, the multiplexer confirms a current speed of the streaming data which is being played back in the media framework 112. The multiplexer sets a bit rate corresponding to the current speed as a target bit rate and transmits the buffered streaming service data, segment, or chunk to be transmitted to the media framework 112 by an amount corresponding to the target bit rate. In operation 408, the streaming service data, the segment, or the chunk may be transmitted to the media framework at a speed corresponding to the target bit rate. Specifically, it is assumed that the media framework plays back a video of 1 Mbps. Then, by adjusting the speed of the streaming service data, segment, or chunk transmitted through operation 408 to 1 Mbps, it is possible to prevent the image quality of the video which is being played back from rapidly deteriorating.

In a specific embodiment, speed limitation according to the embodiment of the present disclosure may limit the size of a TCP reception window advertised for the LTE network 402 to limit the ultimate throughput. For example, the TCP throughput of the LTE network 402 can be expressed as Equation 3.

$$\text{TCP throughput} = \min(\text{TCP reception window}, \text{congestion window})/\text{round trip time} \quad \text{Equation 3}$$

Here, the congestion window is used in a TCP and can be defined as an amount of bytes that can be sent to a server at one time. Since the TCP follows a process of transmitting a next packet after receiving ACK for a transmitted packet, the congestion window is used to adjust an amount of transmission according to a network situation while increasing the efficiency of the TCP. The round trip time indicates the time until the ACK for the transmission of the corresponding packet is received from the terminal after the server transmits the packet to a terminal. Thus, by limiting the size of the TCP reception window to a streaming service data/segment/chunk having a size corresponding to a target bit rate, it is possible to limit the speed of the streaming service data/segment/chunk, which is actually introduced into the media framework 112.

Figure 4B:
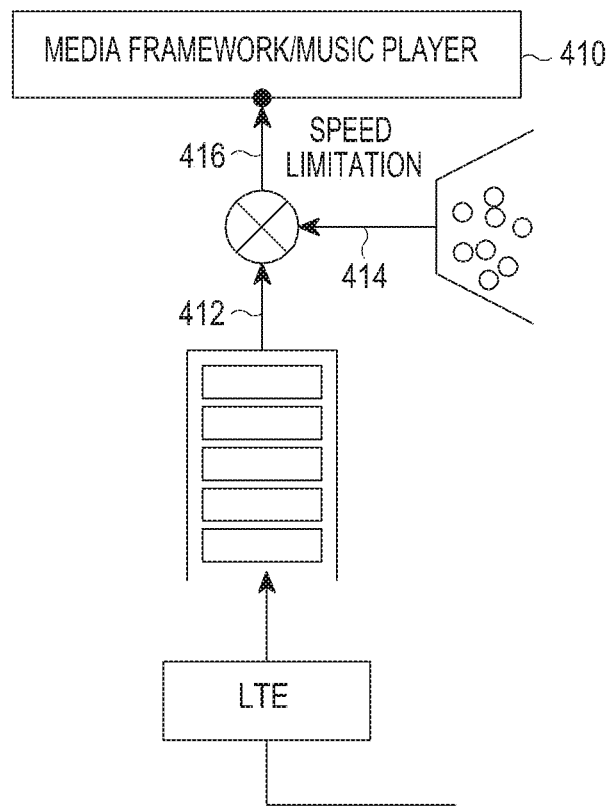
FIG. 4B is another example of a speed limitation method in a single-network-based streamlining mode according to an embodiment of the present disclosure.

FIG. 4B is another example of a speed limitation method in a single-network-based streamlining mode according to an embodiment of the present disclosure. For convenience of description, it is assumed that the framework of a terminal is configured as shown in FIG. 1. It is assumed that a streaming service received by a terminal is, for example, a music streaming service. A music file provided in a music streaming service is relatively small in size, and the LTE speed is significantly higher than the playback speed of the music file. Therefore, in comparison with a video streaming service, the music streaming service is rather a method of downloading and playing back the corresponding music file than a streaming method. In the case of using such a music streaming service, when a different song is selected during the playback of a specific music, all the files of the specific music which is being played back are already received so that unnecessary data charges may occur. In this case, in the same manner as in FIG. 4A, the media framework/music player 410 may perform speed limitation on music streaming service data received from the LTE network.

Figure 4C:
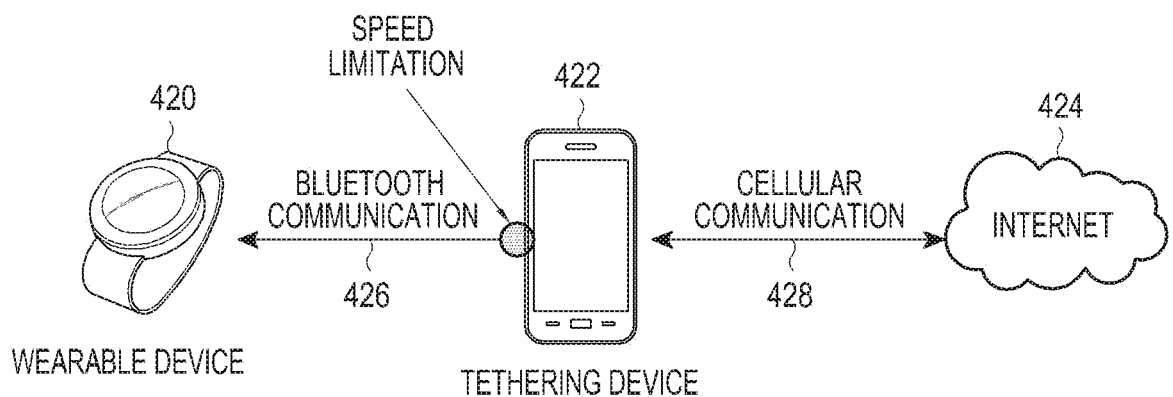
FIG. 4C is an example of a specific embodiment to which the music streaming service according to an embodiment of the present disclosure.

FIG. 4C is an example of a specific embodiment to which the music streaming service of FIG. 4B is applicable.

Referring to FIG. 4C, it may be assumed that a wearable device 420 is provided with a music streaming service via, for example, Bluetooth communication with a tethering device 422. The tethering device 422 is connected to an Internet 424 via the Internet 424 and cellular communication 428. Then, the tethering device 422 transmits the music streaming service data received through the cellular communication 428 to the wearable device 420. At this time, the wearable device 420 according to the embodiment of the present disclosure may limit the inflow speed of data that is introduced through the tethering device 422 in consideration of the Bluetooth performance.

Although the case in which the speed limitation method according to the embodiment of the present disclosure is applied to a music streaming scheme has been described as an example, the speed limitation method is also applicable to other applications that provide services other than music services.

Figure 5:
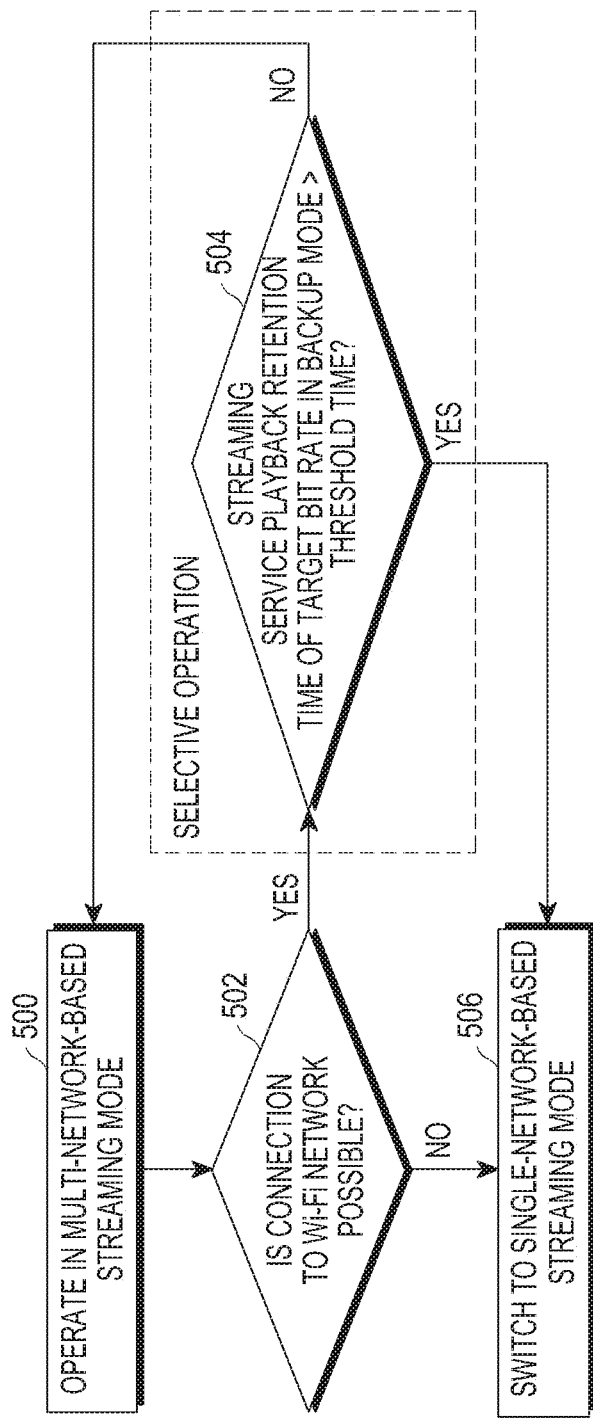
FIG. 5 is an example of a flowchart of an operation of switching from a multi-network-based streaming modes to a single-network-based streaming modes according to an embodiment of the present disclosure.

FIG. 5 is an example of a flowchart of an operation of switching from a multi-network-based streaming mode to a single-network-based streaming mode according to an embodiment of the present disclosure. For convenience of description, it is assumed that a terminal supports a Wi-Fi interface and a cellular interface.

Referring to FIG. 5 in operation 500, the terminal operates in a multi-network-based streaming mode. Next, in operation 502, the terminal determines whether it can be connected to the Wi-Fi network. In operation 506, when the connection to the Wi-Fi network is impossible based a result of the determination, the terminal switches from the corresponding mode to a single-network-based streaming mode. Next, when the terminal is switched to the single-network-based streaming mode and operates, the terminal may control the speed of a streaming service content introduced from the corresponding single-network so as to correspond to a target bit rate in the manner described in FIGS. 4A to 4C.

When the connection to the Wi-Fi network is possible based the result of the determination, operation 504 may be selectively performed. In operation 504, the terminal determines whether a streaming service playback retention time of the target bit rate exceeds a threshold time in a backup mode. Here, the threshold time refers to a minimum time for determining that the streaming service of the target bit rate is stably provided.

When the streaming service playback retention time exceeds the threshold time based on a result of the determination, the terminal proceeds to operation 506 in order to receive the remaining streaming service data which fails to be received from the Wi-Fi network, and switches to the single-network-based streaming mode. Next, when the streaming service playback retention time is equal to or shorter than the threshold time based on the result of the determination, the terminal maintains the multi-network-based streaming mode.

Meanwhile, although not shown in the drawing, when the terminal is switched to the single-network-based streaming mode at the time of the playback of the streaming service content and then the connection to the Wi-Fi network is possible again, the corresponding procedure returns to the operation 500 so that the terminal may be switched to the multi-network-based streaming mode without having to determine whether a mode switching condition is satisfied or whether user consent is present or absent.

Figure 6:
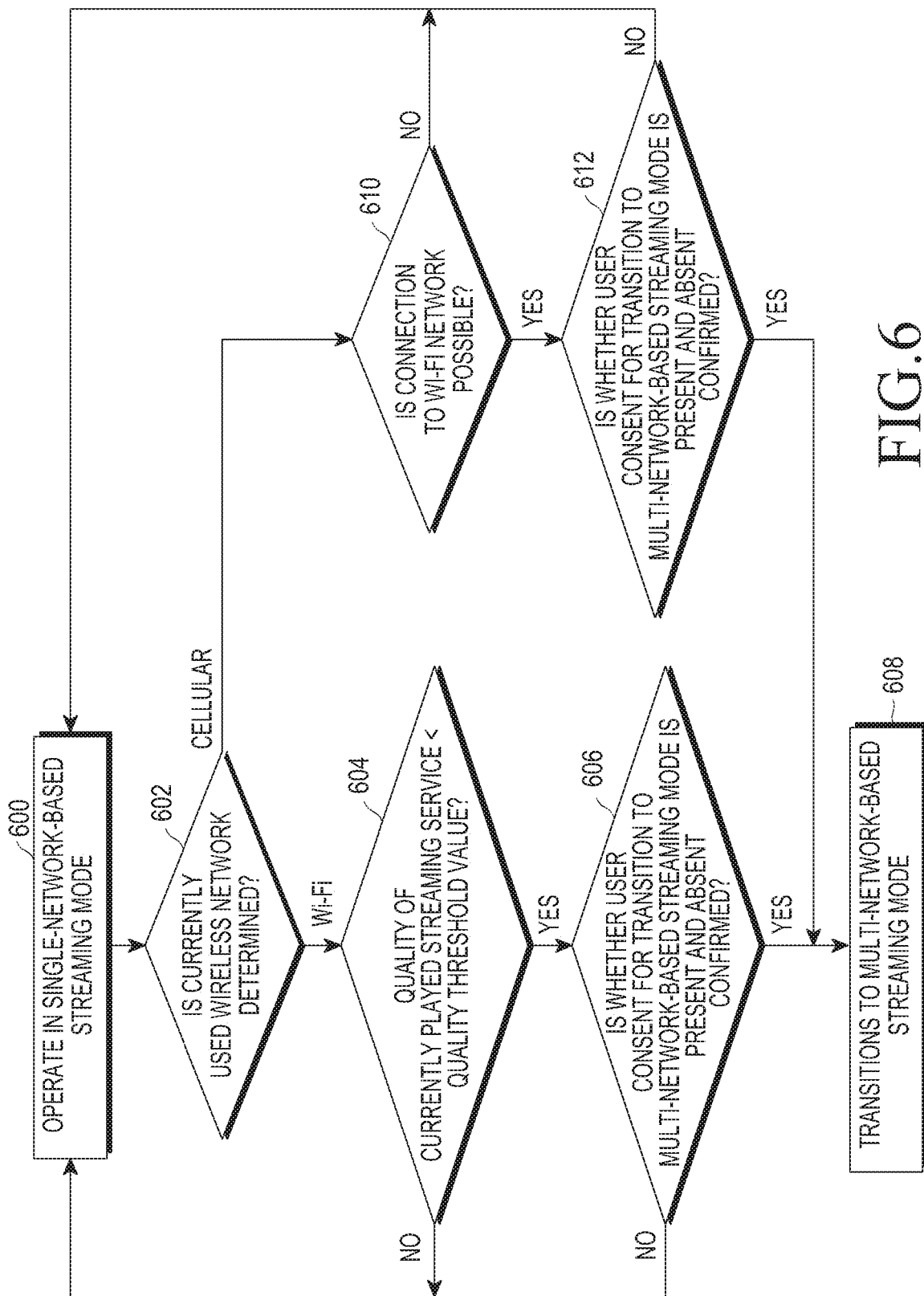
FIG. 6 is an example of a flowchart of an operation of switching from a single-network-based streaming mode to a multi-network-based streaming mode according to an embodiment of the present disclosure.

FIG. 6 is an example of a flowchart of an operation of switching from a single-network-based streaming mode to a multi-network-based streaming mode according to an embodiment of the present disclosure. For convenience of description, it is assumed that a terminal supports a Wi-Fi interface and a cellular interface.

Referring to FIG. 6, in operation 600, the terminal operates in a single-network-based streaming mode. In the embodiment of FIG. 6, the mode switching condition differs depending on the type of the currently used wireless network. Accordingly, in operation 602, the terminal confirms the currently used wireless network. When the currently used wireless network is the Wi-Fi network based on a result of the confirmation, it is possible to utilize a unique adaptive bit rate-selection function of an adaptive streaming scheme. Specifically, the adaptive streaming scheme adaptively adjusts the quality of the streaming service, for example, the playback quality in the case of a video service, so as to correspond to an available bandwidth of the network. Therefore, the degradation of the playback quality of the streaming service received through the Wi-Fi network means that the degradation of the performance of the currently used Wi-Fi occurs. Next, when the currently used wireless network is the Wi-Fi network based on the result of the confirmation of operation 602, the corresponding procedure proceeds to operation 604 so that the terminal according to the embodiment of FIG. 6 estimates the state of the Wi-Fi network. Next, in order to use an additional connection to the cellular network only when the estimated performance degradation of the Wi-Fi network occurs, the terminal confirms and determines whether the quality of the currently played streaming service is smaller than a predetermined quality threshold in operation 604.

Meanwhile, according to the embodiment of the present disclosure, an operation of confirming user consent may also obtain the user consent in different ways according to the type of the currently used wireless network. When the currently used wireless network is the Wi-Fi network, the mode switching to the multi-network-based streaming modes means the additional connection to the cellular network in which data charges occurs. Therefore, in this case, the user consent means the consent to the additional data charges that occurs due to the connection to the cellular network. As a result, when the quality of the currently played streaming service is smaller than the predetermined quality threshold based on a result of the determination in operation 604, the corresponding procedure proceeds to operation 606. Specifically, in operation 606, the terminal confirms the user consent for the transition to the multi-network-based streaming mode, that is, the consent for the data charges resulting from the additional connection to the cellular network. For example, the terminal may display a pop-up window that requests a user input for the consent for data charges from a user through a display. When the quality of the currently played streaming service is greater than or equal to the predetermined quality threshold based on the result of the determination in operation 604, the corresponding procedure returns to operation 600 so that the terminal maintains the single-network-based streaming mode.

In comparison, when the currently used wireless network is the cellular network based on the result of the determination in operation 602, the user is currently using the cellular network in which data charges occurs. Accordingly, in operation 610, the terminal according to the embodiment of the present disclosure determines whether the connection to the Wi-Fi network is possible. When the connection to the Wi-Fi network is impossible based on a result of the determination, the corresponding procedure returns to operation 600 so that the terminal maintains the connection to the currently used cellular network while maintaining the single-network-based streaming mode. When the connection to the Wi-Fi network is possible based on the result of the determination, the corresponding procedure proceeds to operation 612. In operation 612, the terminal confirms whether user consent for the transition to the multi-network-based streaming mode is present or absent. Specifically, since the currently used wireless network is the cellular network, the user consent may be confirmed by notifying the user that further use of the Wi-Fi network is possible to obtain user consent for the further use of the Wi-Fi network. Similarly, the terminal may notify the user that the further use of the Wi-Fi network is possible through the display, and may display a window for requesting a user input corresponding to the presence and absence of the user consent for the further use of the Wi-Fi network to obtain the user input. When the user input corresponding to the consent for the further use of the Wi-Fi network is obtained based on a result of the confirmation, the terminal transitions to the multi-network-based streaming mode in operation 608. When the user input corresponding to the consent for the further use of the Wi-Fi network is not obtained based on the result of the confirmation, the corresponding procedure returns to operation 600.

Figure 7:
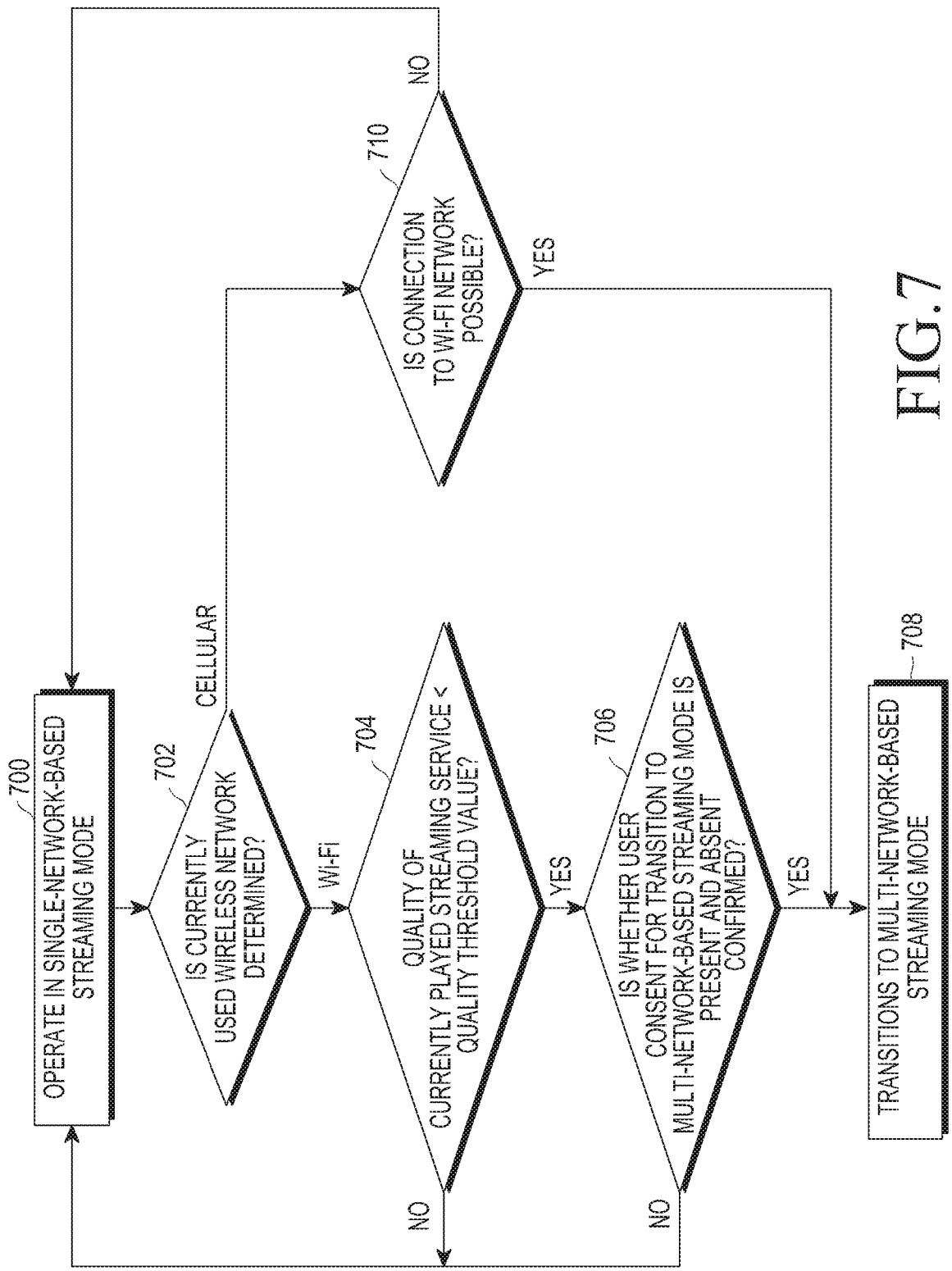
FIG. 7 is another example of a flowchart of an operation of switching in a single-network-based streaming mode to a multi-network-based streaming mode according to an embodiment of the present disclosure.

FIG. 7 is another example of a flowchart of an operation of switching a single-network-based streaming mode to a multi-network-based streaming mode according to an embodiment of the present disclosure. For convenience of description, it is assumed that the terminal supports a Wi-Fi interface and a cellular interface.

In the embodiment of FIG. 7, when the wireless network that is currently used by the terminal is the Wi-Fi network, mode switching to the multi-network-based streaming mode is performed when the same condition as in FIG. 6 is satisfied. An operation of confirming whether user consent for the transition to the multi-network-based streaming mode is present or absent in operation 706 may or may not be selectively performed according to the embodiment. On the other hand, when the currently used wireless network is the cellular network, data charges does not occur due to the additional connection to the Wi-Fi network, so that the corresponding procedure proceeds to operation 708 without obtaining separate user consent for the transition to the multi-network-based streaming modes. In operation 708, the transition to the multi-network-based streaming mode is performed. The remaining operations are the same as those of FIG. 6, so redundant explanations are omitted.

Figure 8:
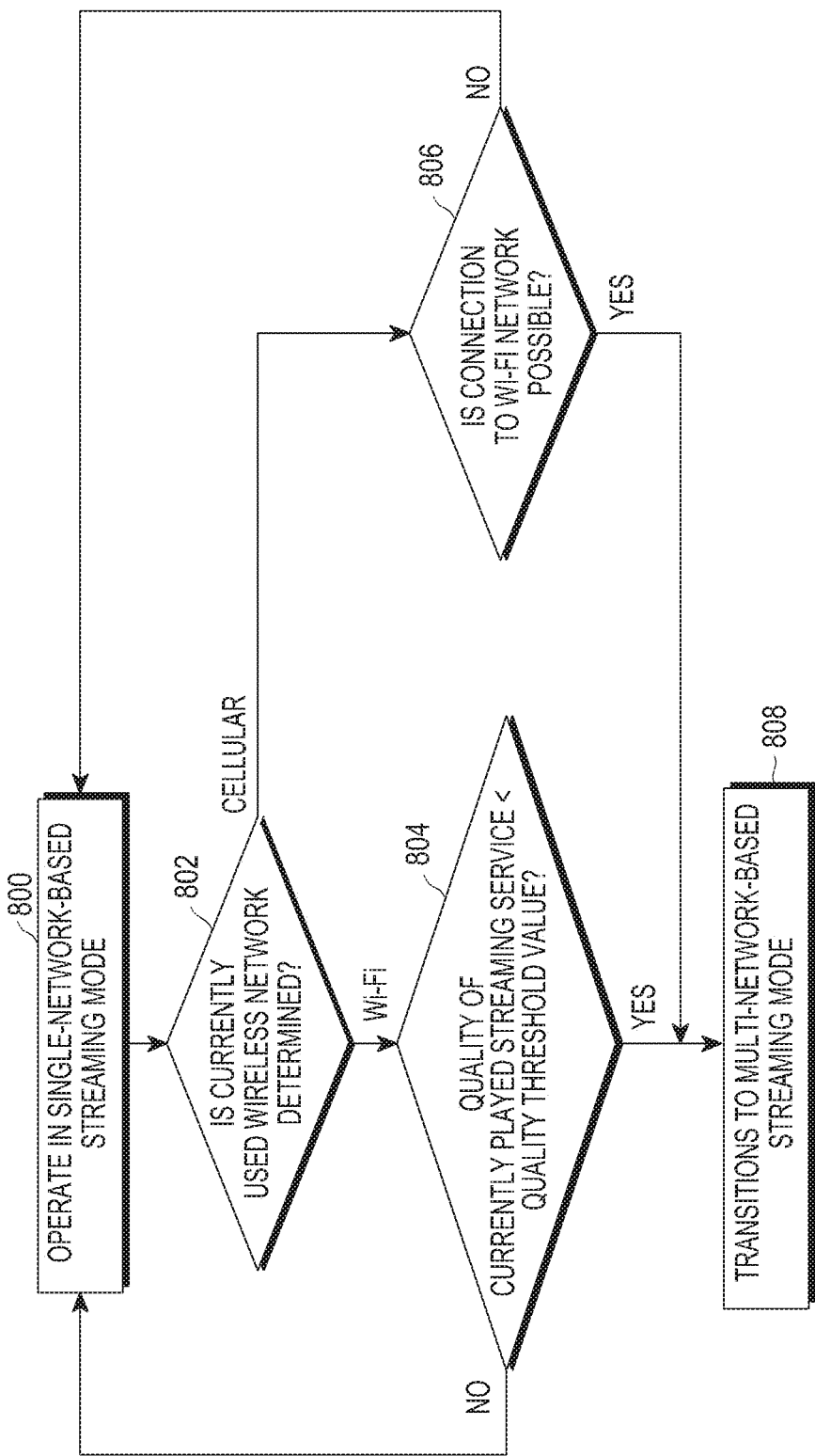
FIG. 8 is another example of a flowchart of an operation of switching from a single-network-based streaming mode to a multi-network-based streaming mode according to an embodiment of the present disclosure.

FIG. 8 is another example of a flowchart of an operation of switching from a single-network-based streaming mode to a multi-network-based streaming mode according to an embodiment of the present disclosure. For convenience of description, it is assumed that a terminal supports a Wi-Fi interface and a cellular interface. In the embodiment of FIG. 8, it is assumed that the consent for the transition to the multi-network-based streaming mode received from a user is received consecutively a predetermined number of times or more.

Accordingly, referring to FIG. 8, when the currently used wireless network satisfies the condition that the quality of the streaming service that is currently played back in the Wi-Fi network is less than the quality threshold value in operation 804, the terminal transitions to the multi-network-based streaming mode in operation 808 without obtaining the user consent for the transition to the multi-network-based streaming mode. Similarly, in the case of the currently used wireless network is the cellular network, when it is confirmed in operation 806 that the connection to the Wi-Fi network is possible, the corresponding procedure proceeds to operation 808 without obtaining the user consent for the connection to the Wi-Fi network. In addition, the remaining operations are the same as those of the operations of FIG. 6, so redundant explanations are omitted.

According to another embodiment, although not shown in FIG. 8, the terminal detects that the condition of operation 804 is satisfied, and determines whether the consent for the transition to the multi-network-based streaming mode is consecutively received from a user predetermined number of times or more. Next, when the consent is not received from a user predetermined number of times or more based on a result of the determination, the terminal may further confirm whether the user consent for data charges that occurs due to the further connection to the cellular network for the transition to the multi-network-based streaming mode is present or absent, in the same manner as that in operation 606. Next, when the user consent for data charges is obtained, the corresponding procedure proceeds to operation 808. Next, when the consent for data charges is received predetermined number of times or more based on the result of the determination, the corresponding procedure directly proceeds to operation 808 as shown in FIG. 8.

Figure 9:
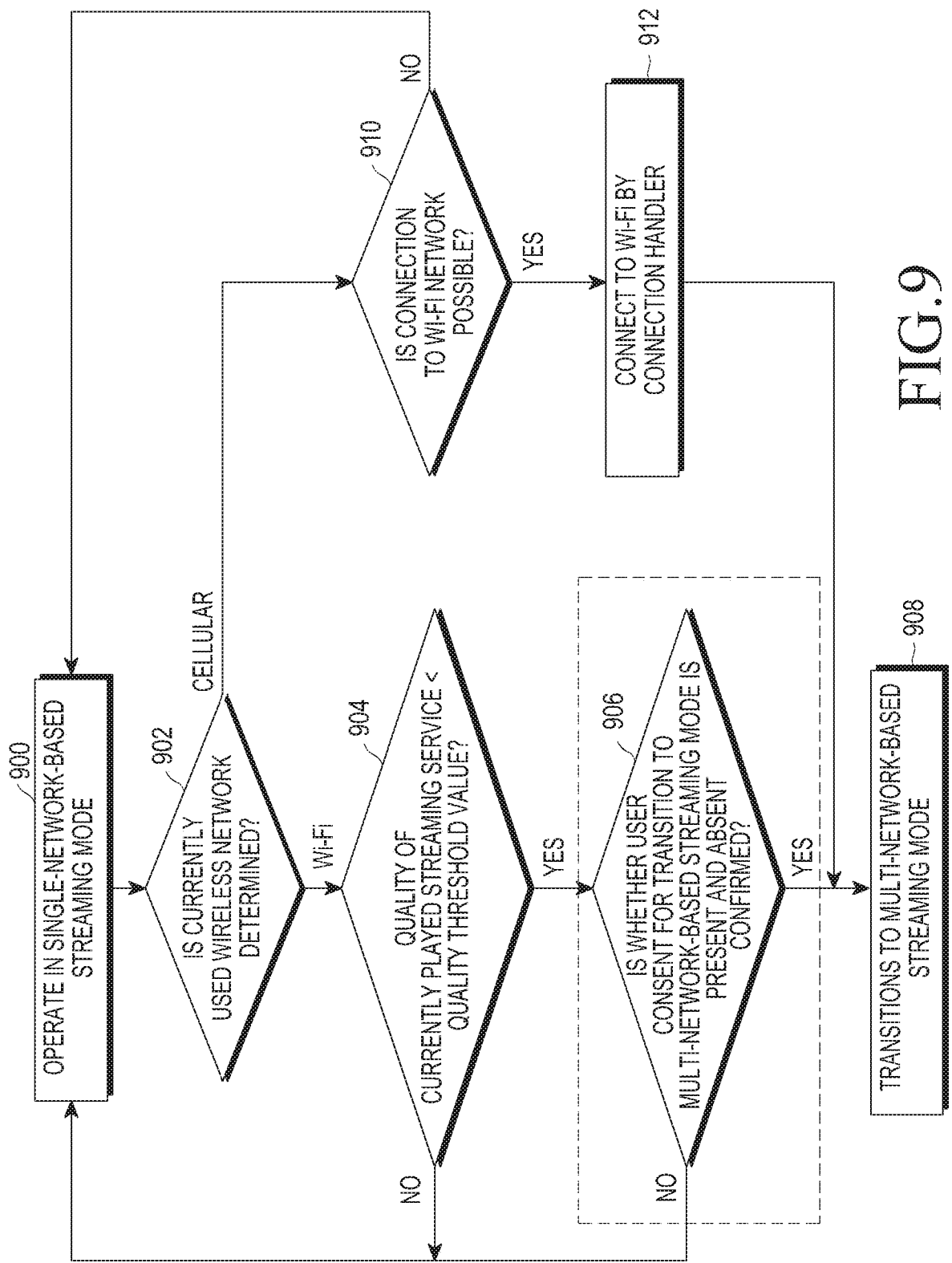
FIG. 9 is an another example of a flowchart of an operation of switching from a single-network-based streaming mode to a multi-network-based streaming mode according to an embodiment of the present disclosure.

FIG. 9 is another example of a flowchart of an operation of switching from a single-network-based streaming mode to a multi-network-based streaming mode according to an embodiment of the present disclosure. For convenience of description, it is assumed that a terminal supports a Wi-Fi interface and a cellular interface.

In the embodiment of FIG. 9, when the currently used wireless network is the Wi-Fi network, the corresponding operations are the same as those of FIG. 7, so redundant explanations are omitted.

On the other hand, when the currently used wireless network is the cellular network, in the embodiment of FIG. 9, the wireless network that can be further used is set to be switched to the multi-network-based streaming mode only when the wireless network is the Wi-Fi network in which data charges does not occur. Accordingly, referring to FIG. 9, in operation 910, the terminal determines whether the connection to the Wi-Fi network is possible. When the connection to the Wi-Fi network is possible based on a result of the determination, the corresponding procedure proceeds to operation 912. In operation 912, the terminal performs the connection to the Wi-Fi network by a connection handler in a framework of the terminal.

When the connection to the Wi-Fi network is impossible based on the result of the determination, the corresponding procedure returns to operation 900 so that the terminal maintains the single-network-based streaming modes.

Meanwhile, although the switching operations to the multi-network-based streaming mode are shown according to the embodiments of the present disclosure in FIGS. 5 to 9, it is obvious that various modifications can be made in FIGS. 5 to 9. For example, although the consecutive operations are shown in FIGS. 5 to 9, it is obvious that the operations described in FIGS. 5 to 9 may be overlap each other, may be performed in parallel, may be performed in a different order, or may be performed multiple times.

Figure 10:
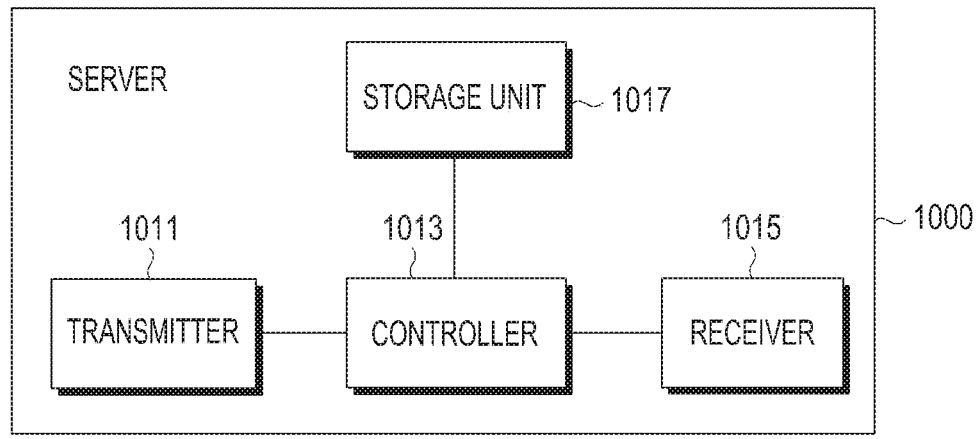
FIG. 10 is an example of a schematic diagram illustrating the internal structure of a server in a communication system supporting a plurality of radio access interfaces according to an embodiment of the present disclosure.

FIG. 10 is an example of a schematic diagram illustrating the internal structure of a server in a communication system supporting a plurality of radio access interfaces according to an embodiment of the present disclosure.

Referring to FIG. 10, a server 100 includes a transmitter 1011, a controller 1013, a receiver 1015, and a storage unit 1017.

First, the controller 1013 controls the overall operation of the server 1000. The controller 1013 controls the server 1000 to perform overall operations related to a streaming service providing operation according to the embodiment of the present disclosure, i.e., a streaming service providing operation for a terminal supporting a plurality of radio access interfaces. Here, the operation of providing a streaming service for the terminal supporting the plurality of radio access interfaces according to the embodiment of the present disclosure is the same as that described with reference to FIG. 1 to FIG. 9, so a detailed description thereof will be omitted here.

The transmitter 1011 transmits various signals and various messages to the terminal or the like under the control of the controller 1013. Here, the various signals and various messages transmitted by the transmitter 1011 are the same as those described with reference to FIG. 1 to FIG. 9, so a detailed description thereof will be omitted here.

The receiver 1015 receives various signals and various messages from the terminal according to the control of the controller 1013. Here, the various signals and various messages received by the receiver 1015 are the same as those described with reference to FIG. 1 to FIG. 9, so a detailed description thereof will be omitted here.

The storage unit 1017 stores programs and various kinds of data required for the operation of the server 1000, particularly, information or the like related to the streaming service providing operation for the terminal supporting the plurality of radio access interfaces according to the embodiment of the present disclosure. In addition, the storage unit 1017 stores the various signals and various messages which the receiver 1015 receives from the terminal or the like.

Meanwhile, in FIG. 10, although the server 1000 is implemented as separate units such as the transmitter 1011, the controller 1013, the receiver 1015, and the storage unit 1017, it is obvious that the server 1000 may be implemented in a form obtained by integrating at least two of the transmitter 1011, the controller 1013, the receiver 1015, and the storage unit 1017 into one unit.

Figure 11:
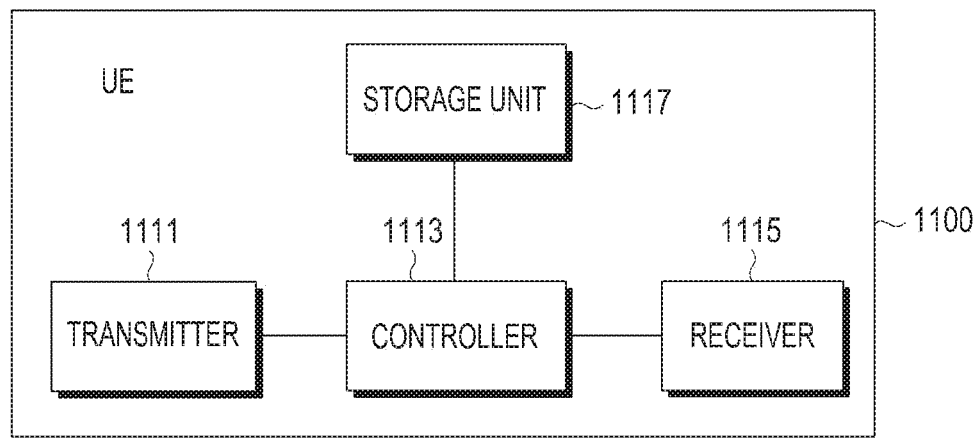
FIG. 11 is an example of a schematic diagram illustrating the internal structure of a terminal in a communication system supporting a plurality of radio access interfaces according to an embodiment of the present disclosure.

FIG. 11 is an example of a schematic diagram illustrating the internal structure of a terminal in a communication system supporting a plurality of radio access interfaces according to an embodiment of the present disclosure.

Referring to FIG. 11, a terminal 1100 includes a transmitter 1111, a controller 1113, a receiver 1115, and a storage unit 1117.

First, the controller 1113 controls the overall operation of the terminal 1100. The controller 1113 controls the terminal 1100 to perform an operation of receiving a streaming service content according to the embodiment of the present disclosure, that is, to perform the overall operation related to the switching to the single-network-based streaming mode or the multi-network-based streaming mode and an operation of receiving the streaming service content in the corresponding mode. The switching to the single-network-based streaming mode or the multi-network-based streaming mode and the operation of receiving the streaming service content in the corresponding mode according to the embodiment of the present disclosure are the same as those described in FIGS. 1 to 9, so a detailed description thereof will be omitted.

The transmitter 1111 transmits various signals and various messages to a server or the like under the control of the controller 1113. Here, the various signals and various messages transmitted by the transmitter 1111 are the same as those described with reference to FIG. 1 to FIG. 9, and a detailed description thereof will be omitted here.

The receiver 1115 receives various signals and various messages from the server according to the control of the controller 1113. Here, the various signals and various messages received by the receiver 1115 are the same as those described with reference to FIG. 1 to FIG. 9, and a detailed description thereof will be omitted here.

The storage unit 1117 stores programs and various kinds of data required for the operation of the terminal 1100, particularly, information or the like related to the switching to the single-network-based streaming mode or the multi-network-based streaming mode and an operation of receiving the streaming service content in the corresponding mode according to the embodiment of the present disclosure. In addition, the storage unit 1117 stores various signals and various messages received from the server by the receiver 1115, and the like.

Meanwhile, in FIG. 11, although the terminal 1100 is implemented as separate units such as the transmitter 1111, the controller 1113, the receiver 1115, and the storage unit 1117, it is obvious that the terminal 1100 may be implemented in a form obtained by integrating at least two of the transmitter 1111, the controller 1113, the receiver 1115, and the storage unit 1117 into one unit.

Particular aspects of the present disclosure may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the aforementioned embodiments, but should be defined by the appended claims and equivalents thereof.

What is claimed is:

1. A method of receiving streaming service data in a mobile communication system supporting a plurality of radio access networks, the method comprising:
   receiving at least a part of the steaming service data on a first mode, wherein the first mode is a mode receiving the streaming service data through both a first network and a second network;
   obtaining a target bit rate of the streaming service data;
   comparing a speed of the second network and the target bit rate of the streaming service data;
   receiving remaining part of the streaming service data through a second mode, in case that the speed of the second network is greater than the target bit rate, wherein the second mode is a mode receiving the streaming service data through the second network; and
   receiving the remaining part of the streaming service data through the first mode, in case that the speed of the second network is equal or less than the target bit rate, wherein the first network and the second network are different radio access networks from each other.

2. The method of claim 1, wherein the receiving the streaming service date through the second network comprises limiting an input speed of the streaming service data provided through the second network, so that the streaming service data having a size corresponding to the target bit rate is received.

3. The method of claim 1, wherein the receiving remaining part of the streaming service data on the first mode comprises:
   determining whether a connection to the second network in which data charges do not occur is possible, when the first network is a network in which the data charges occurs,
   receiving the streaming service data through the second network, in case that the connection to the second network is possible,
   confirming whether a quality of the streaming service data received through the second network is less than a predetermined quality value,
   obtaining user consent, in case that the quality of the streaming service data received through the second network is less than the predetermined quality value based on a result of the confirming, and
   receiving the streaming service data on the first mode, in case that the user consent is obtained.

4. The method of claim 3, wherein the receiving the streaming service data through the second network comprises:

notifying a user that a use of the second network is possible, in case that the connection to the second network is possible, and receiving the streaming service data through the second network, in case that consent for the use of the second network is obtained from the user.

5. The method of claim 3, wherein the obtaining of the user consent comprises requesting a user input corresponding to whether a connection to the first network is possible.

6. The method of claim 1, wherein the receiving of the remaining part comprises maintaining a connection to the first network by requesting a small amount of transmission of the part of the streaming service data to the first network.

7. The method of claim 1, further comprising:

receiving, through the first network, the remaining part of the streaming service data received through the second network, in case that the speed of the second network is smaller than or equal to the target bit rate.

8. A device of receiving streaming service data in a mobile communication system supporting a plurality of radio access networks, the device comprising:

a transceiver configured to transmit and receive a signal to and from a server; and at least one processor coupled to the transceiver, wherein the at least one processor is configured to:

receive at least a part of the steaming service data on a first mode, wherein the first mode is a mode receiving the streaming service data through both a first network and a second network, obtain a target bit rate of the streaming service data based on a quantity of the streaming service data, compare a speed of the second network and the target bit rate of the streaming service data, receive remaining part of the streaming service data on a second mode, in case that the speed of the second network is greater than the target bit rate, wherein the second mode is a mode receiving the streaming service data through the second network, and receive the remaining part of the streaming service data through the first mode, in case that the speed of the second network is equal or less than the target bit rate, and wherein the first network and the second network are different radio access networks from each other.

9. The device of claim 8, wherein the at least one processor is configured to:

receive the streaming service data through at least two networks, and limit an input speed of the streaming service data provided through the second network, so that the streaming service data having a size corresponding to the target bit rate is received.

10. The device of claim 9, wherein, in case that receiving the streaming service data through the second network, the at least one processor is further configured to:

notify a user that a use of the second network is possible, in case that a connection to the second network is possible, and receive the streaming service data through the second network, in case that consent for the use of the second network is obtained from the user.

11. The device of claim 8, wherein, in case that receiving remaining part of the streaming service data on the first mode, the at least one processor is further configured to:

determine whether a connection to the second network in which data charges does not occur is possible, when the first network is a network in which the data charges occurs, receive the streaming service data through the second network, in case that the connection to the second network is possible, confirm whether a quality of the streaming service data received through the second network is less than a predetermined quality value, obtain user consent, in case that the quality of the streaming service data received through the second network is less than the predetermined quality value based on a result of the confirmation, and receive the streaming service data on the first mode, in case that the user consent is obtained.

12. The device of claim 8, wherein the at least one processor is further configured to:

receive the remaining part of the streaming service data, and maintain a connection to the first network by requesting a small amount of transmission of the part of the streaming service data to the first network.

13. The device of claim 8, wherein, in case that the speed of the second network is smaller than or equal to the target bit rate of the streaming service data based on the comparison result, the at least one processor is further configured to receive, through the first network, the remaining part of the streaming service data received through the second network.

* * * * *